July 6, 1926.

W. J. GRUBE

ARTIFICIAL BAIT

Filed August 7, 1925

1,591,704

Inventor
WILLIAM J. GRUBE by Fincel & Fincel
his Attorneys

Patented July 6, 1926.

1,591,704

UNITED STATES PATENT OFFICE.

WILLIAM J. GRUBE, OF DELAWARE, OHIO.

ARTIFICIAL BAIT.

Application filed August 7, 1925. Serial No. 48,720.

Bass and other game fish feed in the shallows and the object of this invention is to provide an improved casting rod bait of such construction that the depth at which it shall travel can be controlled by the speed of the reeling so that the bait can be drawn either at considerable depth or made to skim over the surface without fear of snagging.

The invention is embodied in the example herein shown and described the features of novelty being finally claimed.

In the accompanying drawing—

Figure 1:
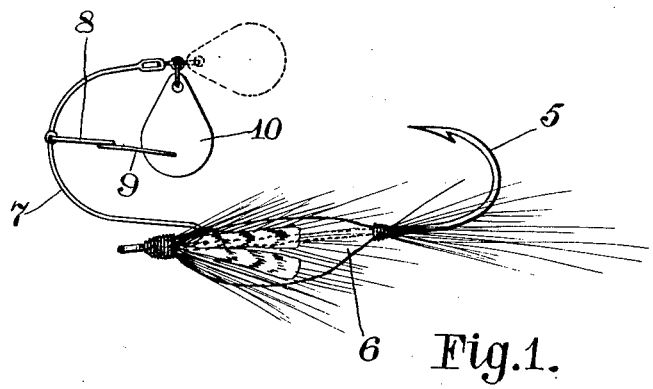
Figure 1 is a view of the device in side elevation.
Figure 2:
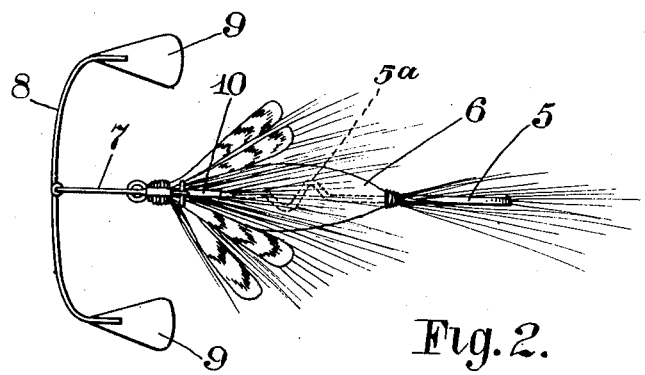
Fig. 2 is a top plan view.

In the views 5 designates the hook and 6 the slug or counterpoise it being of solder molded around the shank of the hook with the hook protruding and standing upward and pointing forward at the rear and the eye or line tie at the forward end. To make more secure the connection between the shank of the hook and the slug and prevent the shank from changing its position with respect thereto the shank is provided with several bends 5ª. Molded at its rear end into the slug is a frame comprising a curved wire 7 extending upwardly and rearwardly and to which is soldered a slightly curved cross wire 8 to the terminals of which are soldered planes 9 either flexible in themselves or having a flexible connection with said terminals. The said planes can therefore be bent or adjusted to stand up or down or in the direction desired. Loosely hung and swiveled to the rear end of wire 7 is an out-of-balance spoon or spinner 10 of bright mother-of-pearl or of some bright metal or other fish attracting material. With this construction a pearl spinner, which though fragile is more attractive than one of any other material can be used because of its protected position behind the frame.

The two wires 7 and 8 constitute a weed guard to prevent snagging as well as the support for the depth regulating planes 9 and spinner 10.

The fly or other simulation of bait is secured to the shank of the hook with a silk wrapping or in any suitable manner usual in manufacturing flies.

In practice the planes are set according to the depth and the speed at which it is desired to reel. If the water be very shallow for a considerable distance out the planes are bent down to stand at a rather appreciable angle so that when the bait is reeled it tends to rise toward the surface of the water and maintain itself there; but the adjustment of the planes is determined by the habits and the craft and judgment of the fisherman. When the bait is reeled the spinner, being out of balance rotates, flutters and flashes and also sets up a vibration that makes the bait seem alive and therefore attractive to the fish.

My invention enables a bait caster to do fly fishing with a bait casting equipment in the shallows where the fish are usually found feeding.

The forms of the parts can be changed without departing from the gist of the invention as claimed.

What I claim is:

1. An artificial bait or lure including, in combination, a slug and an artificial bait thereon, a hook rigidly secured to the slug and extending upwardly and forwardly in reference thereto, a frame secured to the slug and extending upwardly from the slug in advance of the hook and an adjustable plane secured to the frame to elevate the bait when drawn through the water.

2. An artificial bait and lure including, in combination, a slug and an artificial bait thereon, a hook rigidly secured to the slug and extending upwardly and forwardly in reference thereto, a frame secured to the slug in advance of the hook to protect the latter from weeds and adjustable planes secured at opposite sides of the frame to elevate the bait when drawn through the water.

3. An artificial bait or lure including, in combination, a hook, a slug and an artificial bait thereon, a frame secured to the slug in advance of the hook and a plane secured to the frame tending to elevate the bait when drawn through the water, said frame also carrying a spinner.

4. An artificial bait or lure including, in combination, a hook, a slug and an artificial bait thereon, a frame secured to the slug in advance of the hook and adjustable planes secured to the frame tending to elevate the bait when drawn through the water said frame carrying a spinner between said planes.

5. An artificial bait or lure including, in combination, a hook, a slug and an artificial bait thereon, a frame secured to the slug in advance of the hook and adjustable planes secured to the frame tending to elevate the bait when drawn through the water said frame carrying a spinner between said planes and forward of the point of the hook.

6. In an artificial bait or lure, the combination of a slug, a hook fixed therein and extending upwardly and forwardly with reference thereto, a frame secured to the slug and extending upwardly therefrom in advance of the hook, and a plane secured to the frame to elevate the bait when drawn through the water, said frame also carrying a spinner.

7. In an artificial bait, the combination of a hook, a member extending upwardly in advance of the hook to protect the latter from weeds, a pair of laterally arranged planes carried by said hook protecting member to control the bait when drawn through the water, and a spinner attached to the hook protecting member in rear of said protecting member and between said planes.

WILLIAM J. GRUBE.